United States Patent [19]
Kitamura et al.

[11] Patent Number: 5,999,160
[45] Date of Patent: *Dec. 7, 1999

[54] METHOD FOR FORMING SUB IMAGE DATA PACKET INCLUDING DATA OF SUB IMAGE SUPERIMPOSED ON MAIN IMAGE, RECORDING MEDIUM FOR RECORDING SUB IMAGE DATA PACKET, AND IMAGE PROCESS APPARATUS

[75] Inventors: Tetsuya Kitamura, Komae; Shinichi Kikuchi, Yokohama; Hideki Mimura, Yokohama; Kazuhiko Taira, Yokohama, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/421,182

[22] Filed: Apr. 13, 1995

[30]    Foreign Application Priority Data

Apr. 14, 1994   [JP]   Japan .................................... 6-076193

[51] Int. Cl.⁶ .............................. G09G 5/00; H04N 7/00
[52] U.S. Cl. ......................... 345/115; 345/113; 348/466; 348/468; 370/474; 386/1; 386/21
[58] Field of Search .................................... 345/115, 113; 386/111; 348/468, 564, 15, 462, 465, 467, 387, 390, 415; 370/392

[56]    References Cited

U.S. PATENT DOCUMENTS

| | | | |
|---|---|---|---|
| 4,471,377 | 9/1984 | Mogi et al. | 348/468 |
| 4,907,282 | 3/1990 | Daly et al. | 382/9 |
| 5,036,394 | 7/1991 | Morii et al. | 348/468 |
| 5,089,899 | 2/1992 | Nomura et al. | 358/335 |
| 5,164,711 | 11/1992 | Tuel, Jr. . | |
| 5,210,851 | 5/1993 | Kato et al. | 395/425 |
| 5,260,783 | 11/1993 | Dixit | 348/415 |
| 5,448,562 | 9/1995 | Osakabe et al. | 370/392 |
| 5,504,585 | 4/1996 | Fujinami et al. | 386/111 |
| 5,519,443 | 5/1996 | Salomon et al. | 348/467 |
| 5,521,712 | 5/1996 | Oguro | 348/468 |
| 5,526,050 | 6/1996 | King et al. | 348/387 |
| 5,526,130 | 6/1996 | Kim | 348/468 |
| 5,544,176 | 8/1996 | Fujii et al. | 348/390 |
| 5,568,184 | 10/1996 | Shibata et al. | 348/15 |
| 5,568,274 | 10/1996 | Fujinami et al. | 348/390 |
| 5,572,333 | 11/1996 | Moriyama et al. | 386/98 |
| 5,583,577 | 12/1996 | Tsukagohi | 348/468 |
| 5,684,542 | 11/1997 | Tsukagoshi | 348/468 |

FOREIGN PATENT DOCUMENTS 6-121263   4/1994   Japan .

OTHER PUBLICATIONS

D.R. Tarrant, A New Teletext Decoder with Advanced OSD Features for Wide Screen TV, IEEE Transactions on Consumer Electronics, vol. 39, No. 3, Aug. 1993, pp. 166–174.

*Primary Examiner*—Bipin H. Shalwala
*Assistant Examiner*—David L Lewis
*Attorney, Agent, or Firm*—Pillsbury Madison & Sutro, LLP

[57]    ABSTRACT

A sub image display control system is composed of two sub image display control portions that are a display region control portion and a display timing control portion and a display output portion. A sub image data packet is composed of three types of data that are a sub image header, sub image display data, and sub image control data. In this structure, display spatial loss and display temporal loss can be remarkably reduced and sub images with wide applicability can be accomplished.

4 Claims, 26 Drawing Sheets

FIG. 2

| PARAMETER | DESCRIPTION | NUMBER OF BYTES |
|---|---|---|
| SPCSTR | SUB IMAGE CHANNEL FORMING MODE<br><br>\| 7 \| 6 \| 5 \| 4 \| 3 \| 2 \| 1 \| 0 \|<br>\| RESERVED \|\|\|\|\| ASSIGNED FOR SUB IMAGE CHANNEL FORMING MODE \|\|\|<br><br>ASSIGNED BITS=100 : ONLY SUB IMAGE HEADER 101 : HEADER + CONTROL DATA<br>110 : HEADER + DISPLAY DATA<br>111 : HEADER + DISPLAY DATA + CONTROL DATA | ONE BYTE |
| SPCONT | MIXING RATIO OF SUB IMAGE AND MAIN IMAGE : MAIN IMAGE=(255 − ASSIGNED VALUE)/255<br>SUB IMAGE=ASSIGNED VALUE/255 | ONE BYTE |
| SPDST | SUB IMAGE DISPLAY START TIMING : FRAME NUMBER OF MAIN IMAGE (#0,#1,...) | ONE BYTE |
| SPDEN | SUB IMAGE DISPLAY END TIMING : FRAME NUMBER OF MAIN IMAGE (#0,#1,...) | ONE BYTE |
| SPDSIZE | DISPLAY START POSITION OF SUB IMAGE (X,Y), DISPLAY WIDTH, AND DISPLAY HEIGHT OF SUB IMAGE<br><br>\| 7 \| 6 \| 5 \| 4 \| 3 \| 2 \| 1 \| 0 \|<br>\| X COORDINATE (2BYTES) \| Y COORDINATE (2BYTES) \| DISPLAY WIDTH (2BYTES) \| DISPLAY HEIGHT (2BYTES) \| | 8 BYTES |
| SPCINFO | SUB IMAGE COLOR INFORMATION : SELECT ONE OF 16 COLORS FROM PALETTE ON STORY INFORMATION TABLE.<br><br>\| 7 \| 6 \| 5 \| 4 \| 3 \| 2 \| 1 \| 0 \|<br>\| RESERVED \|\|\|\| ASSIGNED FOR SUB IMAGE COLOR INFORMATION (PALETTE COLOR NUMBER) \|\|\|\| | ONE BYTE |
| SPADJINFO | SUB IMAGE CONTOUR COMPENSATING INFORMATION : CONTOUR COMPENSATION EXECUTION FLAG AND CONTOUR COLOR (PALETTE NUMBER)<br><br>\| 7 \| 6 \| 5 \| 4 \| 3 \| 2 \| 1 \| 0 \|<br>\| CONTOUR COMPENSATION EXECUTING FLAG \| CONTOUR COLOR ASSIGNMENT (PALETTE COLOR NUMBER) \|\|\|\|\|\|\| | ONE BYTE |
| SPCDADR | SUB IMAGE CONTROL DATA START ADRESS : RELATIVE ADDRESS FROM BEGINNING OF EACH CHANNEL | 2 BYTES |

A : CONTOUR COMPENSATING WIDTH
(IN THE CASE OF "3")

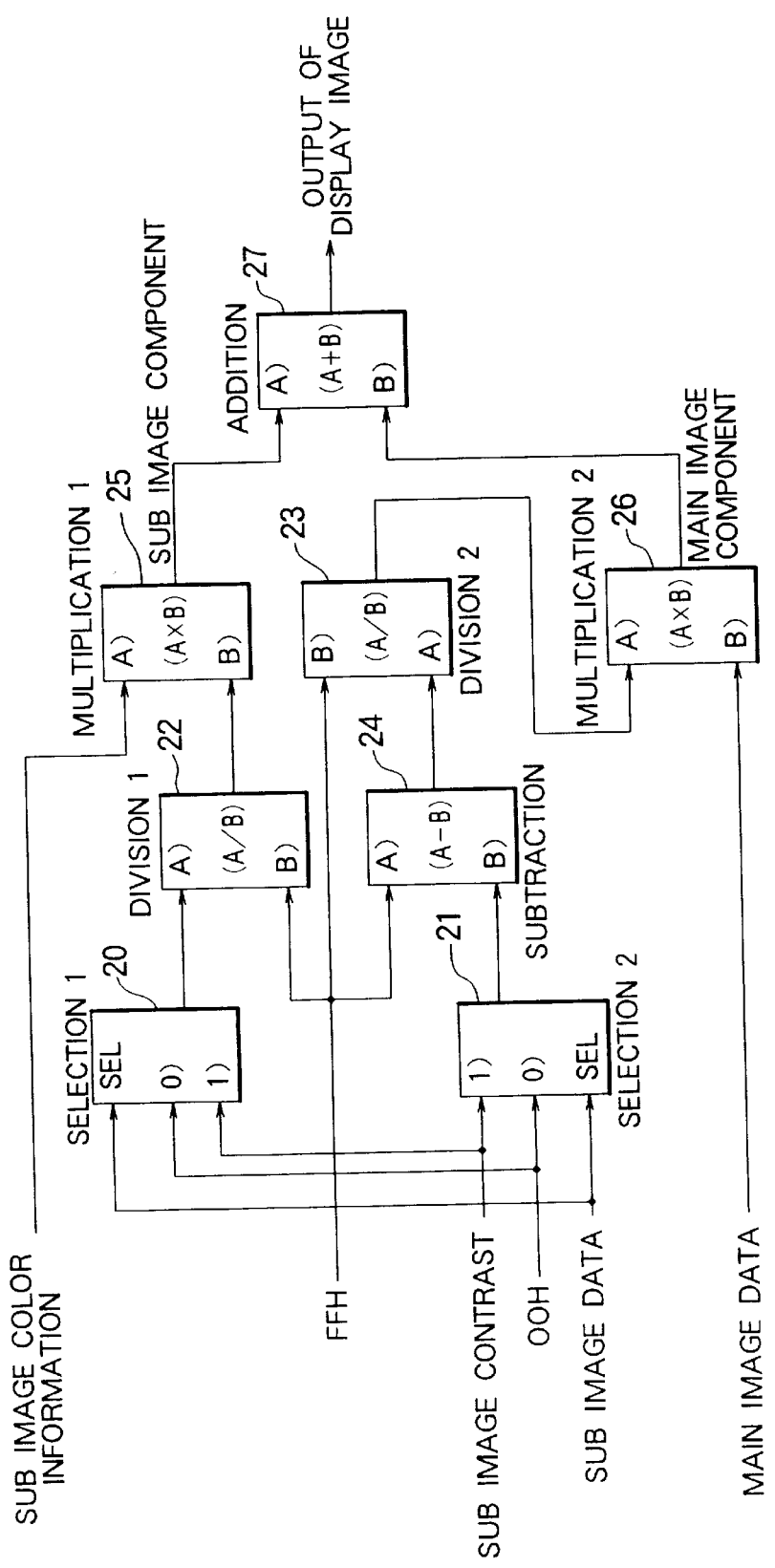

FIG. 20

EXAMPLE OF FRAME CONTROL DATA

| | | |
|---|---|---|
| (a) | CHANGE LINE NUMBER (LINES 4 TO 11) | : REPRESENTS THAT PIXEL CHANGES ARE PRESENT FROM LINE 4 TO LINE 11. |
| | CHANGE START PIXEL NUMBER (POSITION C) | |
| | CHANGE START PIXEL NUMBER (POSITION B) | : REPRESENT THAT PIXEL CHANGES ARE PRESENT AT POSITIONS C,B, AND A ON LINES 4 TO 11. |
| | CHANGE START PIXEL NUMBER (POSITION A) | |
| (b) | CHANGE LIST NUMBER (LINE 12) | : REPRESENTS THAT THERE ARE TWO PIXEL CHANGES ON LINE 12 AND CHANGES DO NOT CONTINUE. |
| | CHANGE START PIXEL NUMBER (POSITION D) | |
| | CHANGE START PIXEL NUMBER (POSITION E) | : REPRESENT THAT PIXEL CHANGES ARE PRESENT AT POSITIONS D AND E ON LINE 12 |
| (c) | CHANGE LINE NUMBER (LINE 14) | : REPRESENTS THAT THERE ARE FOUR PIXEL CHANGES ON LINE 14 AND PIXEL CHANGES DO NOT CONTINUE |
| | CHANGE START PIXEL NUMBER (POSITION D) | |
| | CHANGE START PIXEL NUMBER (POSITION C) | |
| | CHANGE START PIXEL NUMBER (POSITION E) | : REPRESENT THAT PIXEL CHANGES ARE PRESENT AT POSITION D,C,E, AND A ON LINE 14. |
| | CHANGE START PIXEL NUMBER (POSITION A) | |
| (d) | CHANGE LINE NUMBER (END CODE) | |

FIG. 22

| DOT POSITION ON LINE | 1 | 5 | 6 | 10 | 11 | 12 | 15 | 16 | 18 | 20 | 21 | 25 | 26 | 28 |
|---|---|---|---|---|---|---|---|---|---|---|---|---|---|---|
| SUB IMAGE COLOR | 7H | | | | | 2H | | 1H | | 5H | | | | |
| CONTOUR COMPENSATING COLOR | AH | | | | | | | | 4H | | | | | |
| CONTRAST RATIO | 0FH | | | | | | | FFH | | | | | | |

POSITION C → 12
POSITION B → 15
POSITION A → 18

LINE DIRECTION →

EACH VALUE IS REPRESENTED IN HEXADECIMAL NOTATION.

FIG. 23

| 31 | 28 | 27 | | | | | | | | | | | | | | 16 | 15 | | | | 12 | 11 | | | | | | | | | | 0 |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 1 | 0 | 0 | 0 | 0 | 1 | 1 | 0 | 0 | 0 | 0 | 0 | 0 | 0 | 0 | 0 | 1 | 1 | 1 |
| RESERVED | | CHANGE LINE NUMBER | | | | | | | | | | | | | | | NUMBER OF PIXEL CHANGE POINTS | | | | | | NUMBER OF CONTINUOUS LINES | | | | | | | | | |

FIG. 24

| | |
|---|---|
| CHANGE LINE NUMBER | 00043007 H |
| CHANGE START PIXEL NUMBER (POSITION C) | 000C2AFF H |
| CHANGE START PIXEL NUMBER (POSITION B) | 000F1AFF H |
| CHANGE START PIXEL NUMBER (POSITION A) | 001254FF H |
| CHANGE LINE NUMBER (END CODE) | FFFF0000 H |

METHOD FOR FORMING SUB IMAGE
DATA PACKET INCLUDING DATA OF SUB
IMAGE SUPERIMPOSED ON MAIN IMAGE,
RECORDING MEDIUM FOR RECORDING
SUB IMAGE DATA PACKET, AND IMAGE
PROCESS APPARATUS

BACKGROUND OF THE INVENTION

1. Field of the Invention

The present invention relates to an image process apparatus for superimposing a sub image such as a text on a main image such as a TV image, a method for forming a sub image data packet, and a recording medium thereof.

2. Description of the Related Art

Conventionally, translated texts for movies, control and adjustment indications for TV remote control operations, and so forth are superimposed on main images by sub image process systems.

The sub image display systems can be roughly categorized as character code systems and bit map data systems.

In the character code type sub image process systems, as shown in FIG. 27, character data (for example, characters and patterns) stored in a character memory 80 are retrieved from a character generator 81 as character code assigned to characters. The character code is transmitted to a sub image display portion 83. The character code is temporarily stored in a sub image frame buffer 84 and then required characters are displayed. In this system, dedicated hardware such as the character generator 81 is required. Since data to be transmitted to a display portion is only character code, the amount of data to be transmitted and display time for display process can be reduced.

However, since only prepared characters are displayed, the applications for displaying sub images are limited. Thus, although this system is suitable for a sound volume control screen for a TV or the like, it is not suitable in other contexts, such as superimposed texts on movies.

On the other hand, in the case of the bit map data systems, since bit map data of sub images are directly transmitted to the display portion, the dedicated hardware that generates sub images corresponding to the character code is not required. In addition, since the shapes of sub images that can be displayed are not limited, the number of applications for displaying sub images is great.

However, the data rate of the bit map data systems is much higher than that of the character code system. Thus, it can be said that the bit map data systems have losses of data transmission time and display process time.

In other words, in the bit map data systems, each pixel should have sub image color data, sub image contour color data necessary for superimposing a sub image on a main image, and a mixing ratio of the main image and sub image. Thus, the data rate of data to be transmitted to the display portion becomes large.

In the bit map data systems, since pixel data with the same amount of data for one screen of a main image should be transmitted to the display portion, display spatial loss takes place. Hereinafter, the data for one screen is referred to as a frame.

In addition, in the bit map systems and the character code systems, even if the shape of a sub image that is being displayed does not change, sub image data should be continuously transmitted at each display frame interval. Thus, in data transmission and display control of these systems, there is temporal loss.

Consequently, in the above-described conventional sub image process systems, the bit map data system is superior to the character code system in effectiveness of generating sub images. However, the bit map data system has display spatial loss and temporal loss.

SUMMARY OF THE INVENTION

The present invention is made to solve the above-described problems. An object of the present invention is to provide a sub image data packet forming method, a recording medium, and an image process apparatus that can remarkably reduce display spatial loss and display temporal loss and create sub images that can be used in a wide range of applications.

To accomplish the above object, the present invention is a method or a recording medium for forming a sub image data packet including data of a sub image superimposed on a main image, the sub image data packet comprising a sub image data portion for storing sub image data for displaying sub image information, a header portion for storing sub image header data for assigning at least a display position, a display size, and a display color of the sub image data, and a control data portion for storing control data for changing the display position, the display size, and the display color of the sub image data assigned by the sub image header data, pixel by pixel.

According to the present invention, the sub image data packet is composed of the sub image data portion, the header portion, and the control data portion. The sub image data packet allows the display position, the display size, and the display color of the sub image data portion can be changed for each display unit of the main image. Thus, losses in the data transmission, the display control, and so forth can be reduced.

The header portion includes information that represents whether data is present in the sub image data portion and the control data portion. Corresponding to the information, the data structure in the sub image data packet can be changed.

The data of the control data portion included in the sub image data packet is used as control data for the sub image data portion that is displayed when data is absent in the sub image data portion of the sub image data packet. Thus, it is not necessary to transmit the same data. Consequently, display spatial loss and display temporal loss can be reduced.

The display position, the display size, and the display color are not controlled for data in the sub image data portion of the sub image data packet, but are displayed corresponding to predetermined default values when data is absent in the control data portion of the sub image data packet. Thus, the size of the structure of one packet can be reduced. Consequently, temporal loss of data transmission can be reduced.

It is determined that the sub image data packet is in a display clear mode and data of the sub image data portion is cleared when data is absent in the sub image data portion and the control data portion. Thus, it is not necessary to transmit the sub image data portion in this case. Consequently, display spatial loss and display temporal loss can be reduced.

The header portion includes at least sub image display position/size assigning data for assigning a display position and a display size of the sub image superimposed on the main image corresponding to the type of the main image, display color assigning data for assigning a display color of the sub image, compensating execution assigning data for assigning emphasis of contour of the sub image and so forth, sub image contrast assigning data for assigning a mixing ratio of the sub image and the main image, and sub image display start timing assigning data for assigning from what display unit of the main image the display of the sub image is started. Thus, with one packet, the sub image can be superimposed on the main image in various manners.

The data in the sub image data portion includes information that represents data corresponding to the field/frame of the main image. Thus, corresponding to the value of the information, the sub image data portion can be recorded.

A data format of the control data portion is assigned by a change start line number, the number of continuous lines, and the number of pixel change points on each line of a region of the sub image, a pixel number at which a change starts on each change line, a color of the sub image display data after an assigned pixel, a color of a contoured pixel, and a mixing ratio between the main image and the sub image being assigned repeatedly for the number of change lines assigned. Thus, the data amount of the sub image data packet can be remarkably reduced.

The end of continuation of the change line is determined by assigning a predetermined code to a line number, the number of continuous lines, and the number of pixel change points. Thus, with the packet, the end of the continuation of change lines can be detected.

When the sub image information of the sub image data portion is displayed, the display position, the display size, and the display color are assigned corresponding to the header portion by the control data portion for each display unit of the main image. Thus, even if the conventional packet is transmitted, the sub image can be more variably superimposed on the main image than in conventional device.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a table showing a data structure of a sub image header according to the embodiment;

FIG. 10 is a schematic diagram showing a construction of a mixing process system according to the embodiment;

FIG. 20 is a schematic diagram showing an example of frame control data according to the embodiment;

FIG. 22 is a schematic diagram showing changes of sub image color, contour compensating color, and contrast ratio on line "4" according to the embodiment;

FIG. 23 is a schematic diagram showing a change start pixel number in binary notation at position C according to the embodiment;

FIG. 24 is a table showing the data of FIG. 20 in hexadecimal notation;

DESCRIPTION OF THE PREFERRED EMBODIMENT

Next, with reference to the accompanying drawings, an embodiment of the present invention will be described.

Figure 1:
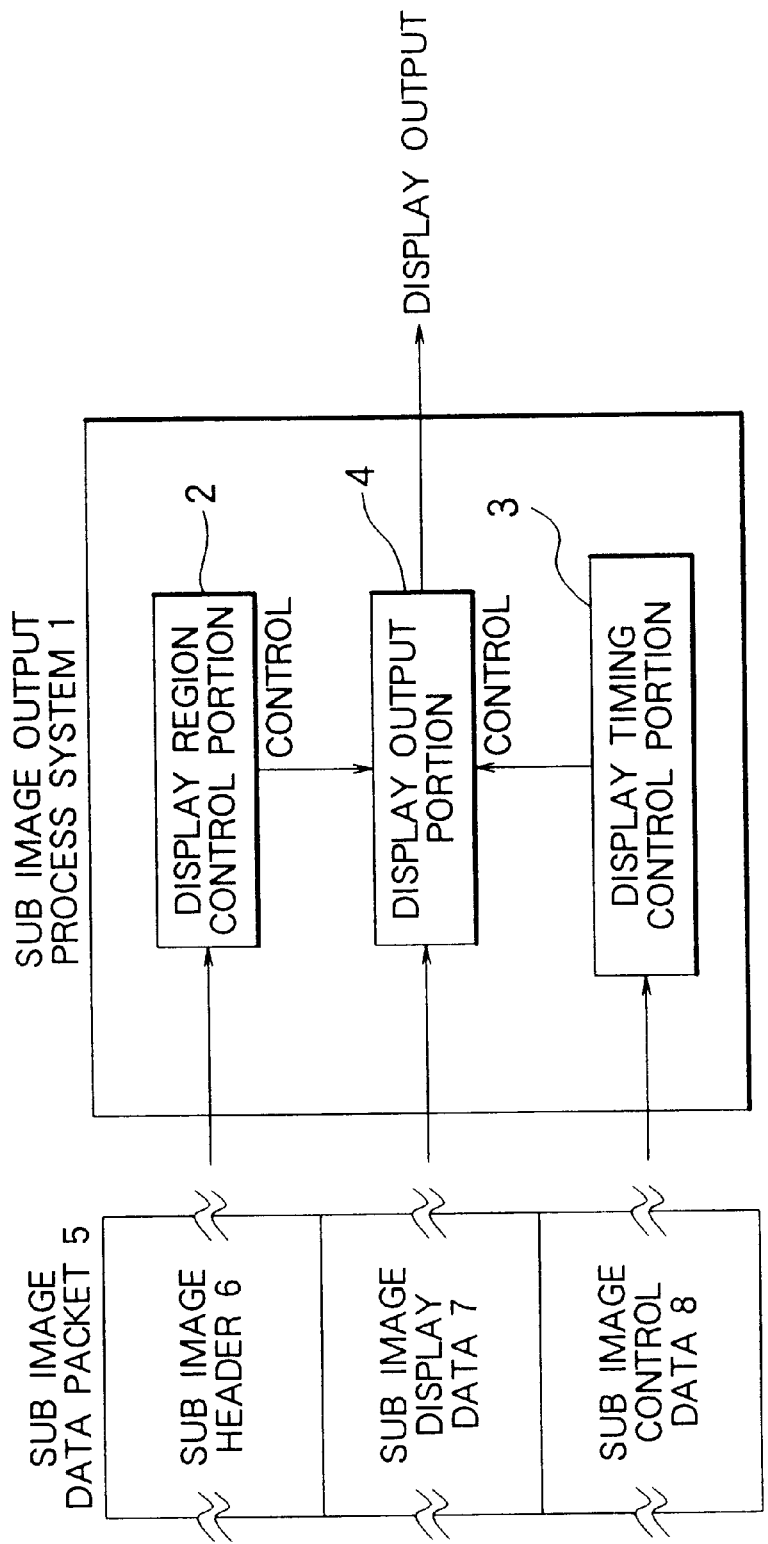
FIG. 1 is a schematic diagram showing a construction of a sub image output process system according to an embodiment of the present invention.

FIG. 1 is a schematic diagram showing a construction of a sub image output process system according to the embodiment of the present invention and a structure of image information, such as a sub image data packet, reproduced from an optical disc or the like by the system. FIG. 2 is a table showing the data structure of a sub image header in the sub image data packet.

As shown in FIG. 1, the sub image output process system 1 comprises two sub image display control portions and a display output portion 4. The sub image display control portions are a display region control portion 2 and a display timing control portion 3.

A sub image data packet 5 is composed of three types of data: a sub image header 6, sub image display data 7, and sub image control data 8. The sub image header 6 is control information for assigning the display region on the main image frame and the display manner of the sub image display data 7. The data arrangement and data amount of each data in the sub image data packet 5 are not basically limited.

As shown in FIG. 2, the sub image header 6 is composed of various control information, such as a sub image channel forming mode stored as sub image forming information (parameter SPCSTR), a mixing ratio of an sub image and a main image stored as a sub image contrast (parameter SPCONT), a sub image display start timing (parameter SPCDST), a sub image display end timing (parameter SPCDEN), a sub image display start position (X, Y), display size such as display width and display height (parameter SPCSIZE), sub image color information (parameter SPCINFO), sub image contour compensating information (parameter SPADJINFO), and sub image control data start address (parameter SPCDADR).

When the sub image output process system 1 reads the sub image data packet 5, it separates three types of data, such as the sub image header 6, the sub image display data 7, and the sub image control data 8, from the sub image data packet 5 corresponding to each control information.

Thereafter, the sub image header 6 is supplied to the display region control portion 2 that controls the display region. The sub image control data 8 is supplied to the display timing control portion 3. The sub image display data 7 is controlled by the display control portions 2 and 3 and supplied to the display output portion 4.

The display region control portion 2 controls the display position on the main image frame and the display manner of the sub image display data 7 corresponding to the received sub image header 6. The display timing control portion 3 performs a temporal display control, such as a color change of a sub image, and a change of the mixing ratio of a main image and a sub image under the condition that the display time interval of one main image frame is one control unit corresponding to the sub image control data 8. The display output portion 4 is controlled by the two display control portions 2 and 3 and the sub image display data 7 is displayed and output from the system.

Since the sub image output process system 1 displays the next sub image screen corresponding to each data of the data packet on the present sub image screen, unless the display region of the sub image is changed or part of the sub image display data 7 is changed, the same sub image screen that is displayed on, for example, a plurality of main image frames is displayed corresponding to the first sub image data packet 5.

Thus, it is not necessary to supply pixel data for frames to be displayed as the sub image display data 7 to the sub image output process system 1. In other words, the sub image output process system 1 satisfactorily operates with display data amount for one frame. Consequently, the data amount necessary for changing images can be remarkably reduced.

As described above, the sub image header 6 shown in FIG. 2 includes the sub image channel forming mode (parameter SPCSTR) that represents whether or not the sub image display data 7 and the sub image control data 8 are present in the sub image data packet 5. The sub image channel forming mode has four sub modes "100", "101", "110", and "111".

The sub image output process system 1 reads the sub image data packet 5. The sub image output process system 1 reads the value of the parameter SPCSTR from the sub image header 6 and determines whether or not to perform the display control for the sub image.

Figure 3:
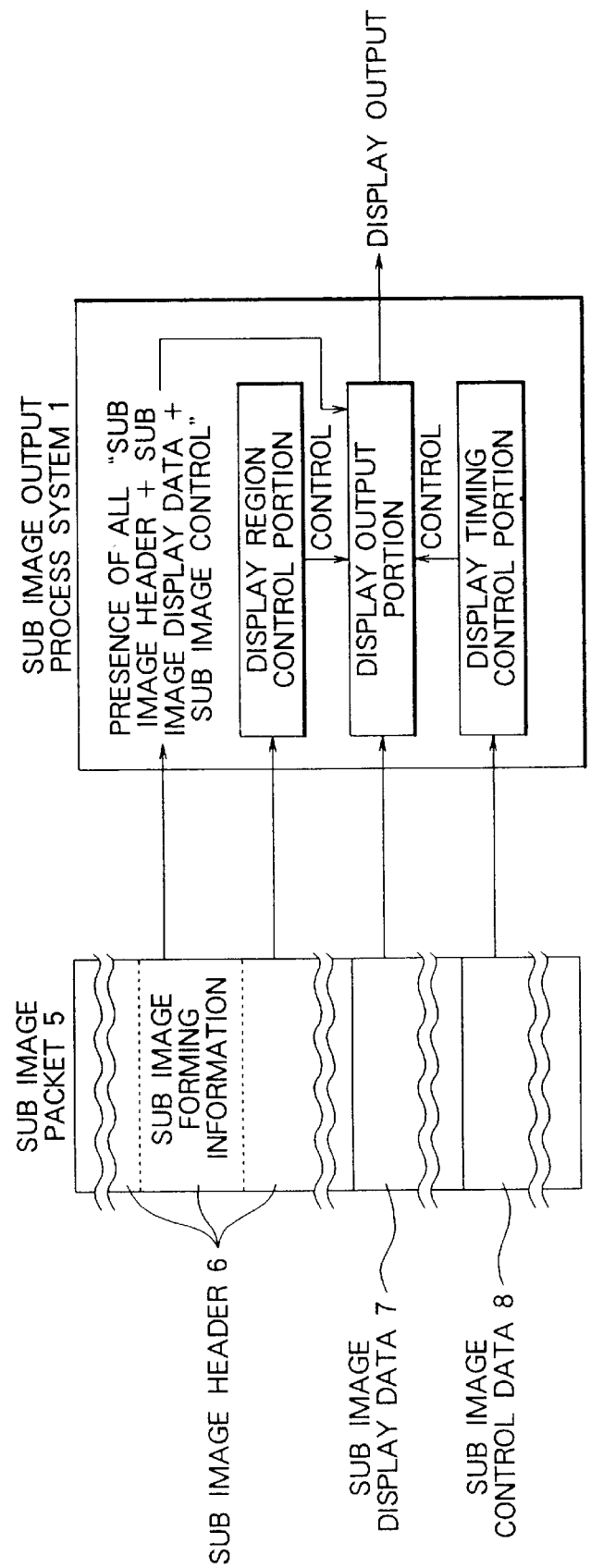
FIG. 3 is a schematic diagram showing a mode in which a sub image channel has data according to the embodiment.

When "111" is assigned to the parameter SPCSTR (in the case of the first mode), as shown in FIG. 3, the sub image channel is composed of the sub image header 6, the sub image display data 7, and the sub image control data 8. Since this mode is a normal mode in which all data is present, the description thereof is omitted.

Figure 4:
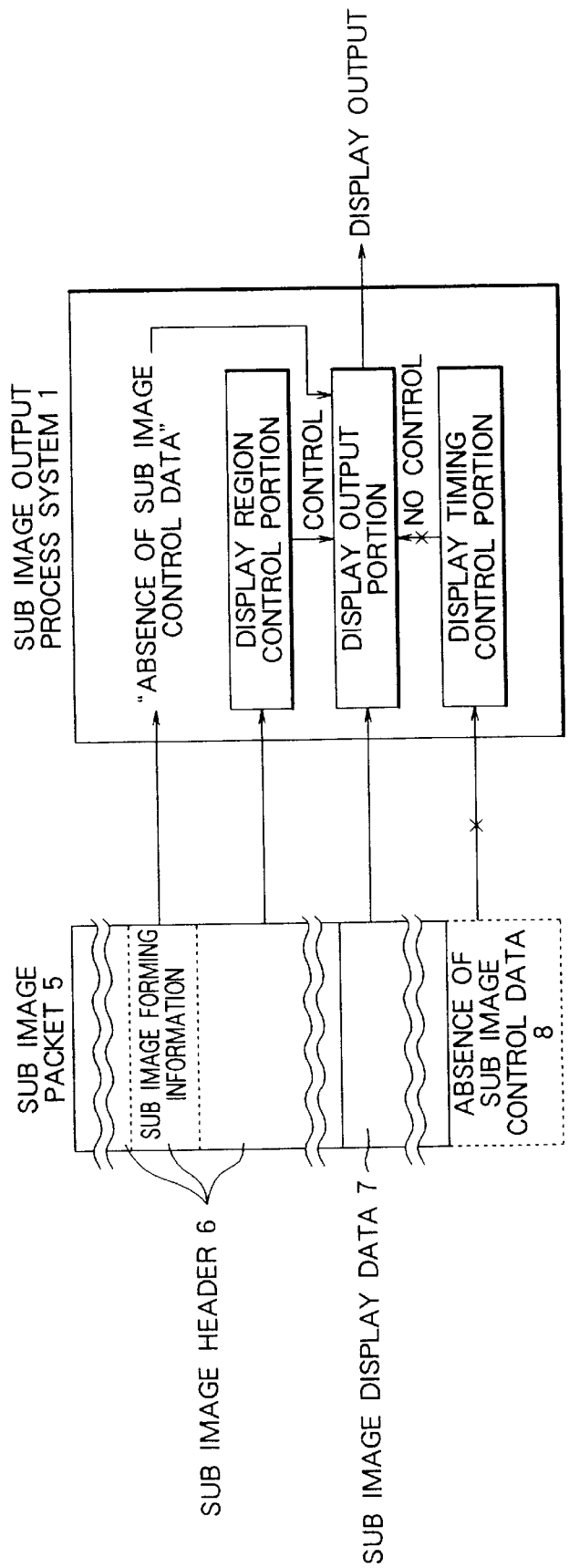
FIG. 4 is a schematic diagram showing a mode in which a sub image channel is composed of a sub image header and sub image display data according to the embodiment.

When "110" is assigned to the parameter SPCSTR (in the second mode), as shown in FIG. 4, the sub image channel is composed of the sub image header 6 and the sub image display data 7. Thus, the sub image control data 8 is absent in the sub image data packet 5.

As shown in FIG. 4, in the second mode, the sub image output process system 1 reads the sub image header 6 and determines that the sub image control data 8 corresponding to the sub image forming information of the sub image header 6 is absent. Thus, the sub image output process system 1 does not perform the display control operation.

Figure 5:
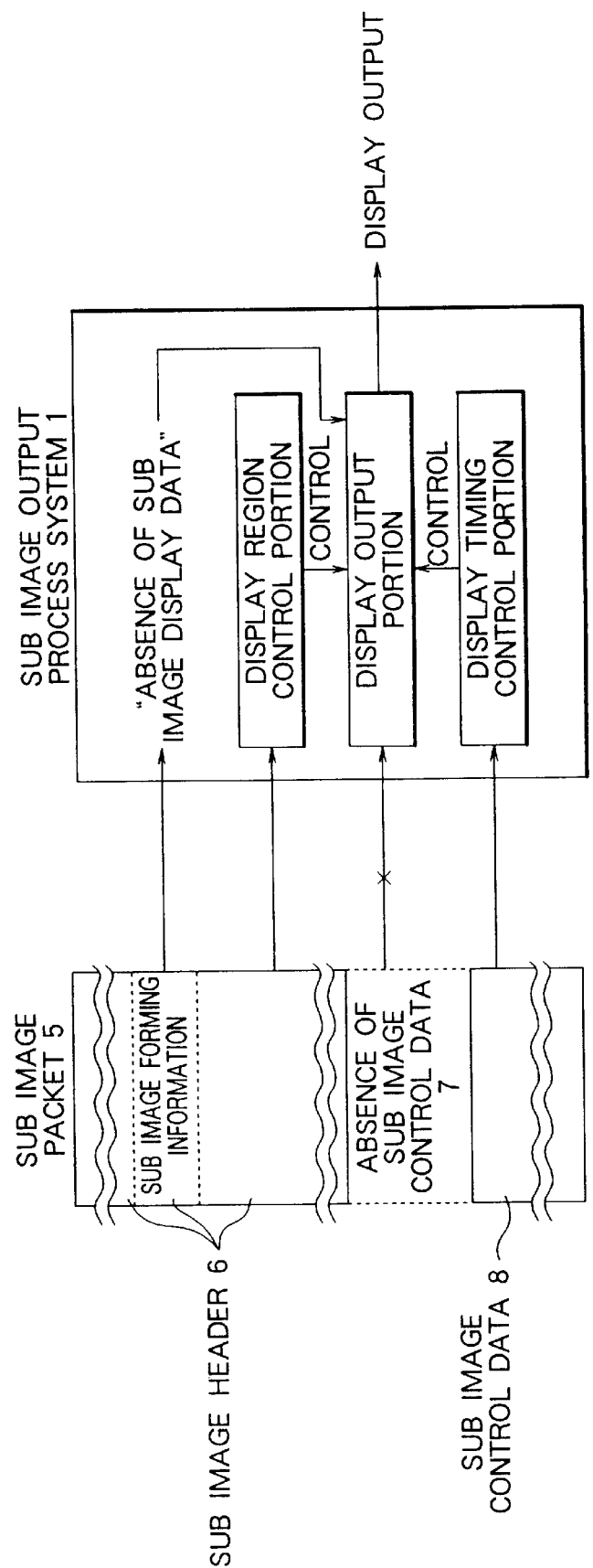
FIG. 5 is a schematic diagram showing a mode in which a sub image channel is composed of a sub image header and sub image control data according to the embodiment.

When "101" is assigned to the parameter SPCSTR (in the third mode), as shown in FIG. 5, the sub image channel is composed of the sub image header 6 and the sub image control data 8. Thus, the sub image display data 7 is absent.

In the third mode, as shown in FIG. 5, the sub image output process system 1 reads the sub image header 6 corresponding to the sub image forming information of the sub image header 6 and determines that the sub image display data 7 is absent. Thus, the sub image output process system 1 does not change the display image. In this case, the sub image output process system 1 continues to display the image corresponding to predetermined default values of the display position, display size, and display color information of the sub image. When the state of the display image changes, new color information is assigned to the changing locations. In this case, in addition to the sub image display data, color information that is newly assigned is formed as a packet of frame control data. Since the position of the frame control data can be assigned, pixel by pixel, the sub image color control can be performed with the same accuracy as the conventional bit map data system.

Figure 6:
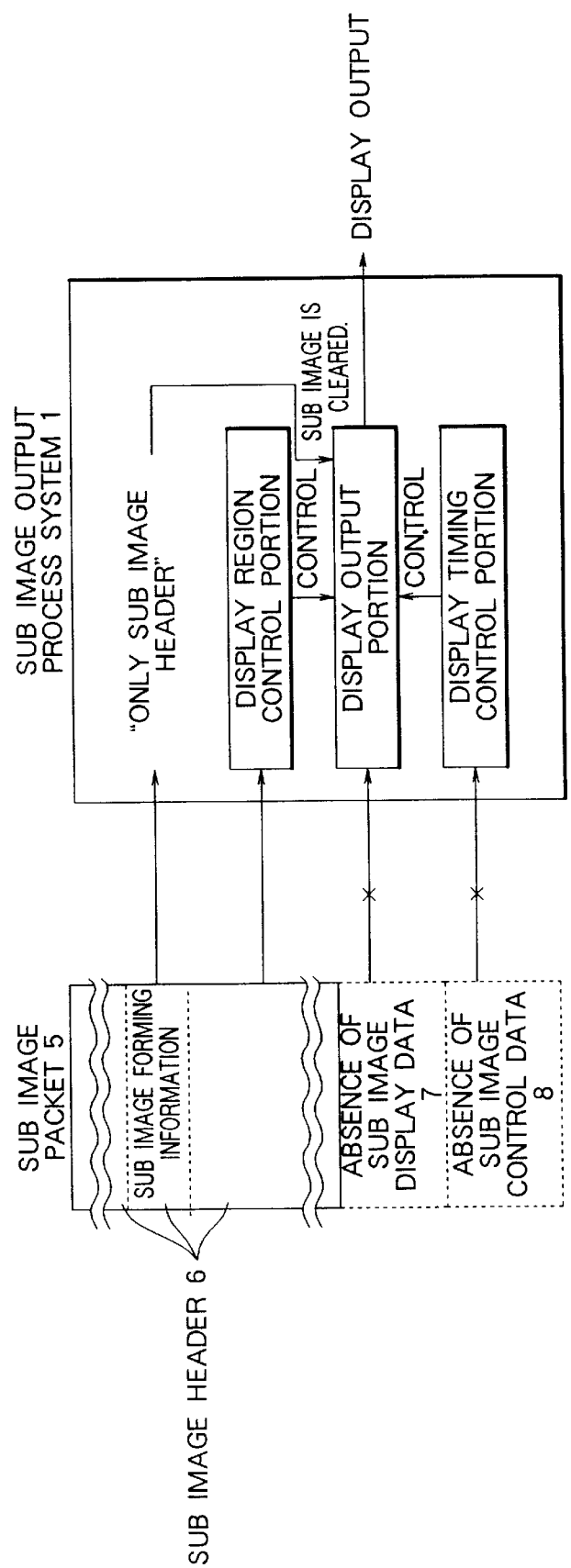
FIG. 6 is a schematic diagram showing a mode in which a sub image channel is composed of only a sub image header.

When "100" is assigned to the parameter SPCSTR (in the fourth mode), as shown in FIG. 6, the sub image channel is composed of only the sub image header 6. In this mode, the sub image screen is cleared. In this mode, the sub image display data 7 and the sub image control data 8 are absent.

In the fourth mode, as shown in FIG. 6, the sub image output process system 1 reads the sub image header 6 corresponding to the sub image forming information of the sub image header 6 and determines that the sub image display data 7 and the sub image control data 8 are absent. Thus, the sub image output process system 1 clears the sub image screen corresponding to information of other sub image data.

Consequently, when temporal control of the sub image control data 8 is not required or when the sub image display data 7 is the same as the data that has been displayed and only the display control is required, even if data is to be present in the sub image data packet 5 (respective data are omitted), the sub image display operation can be performed without a problem.

Next, with reference to FIGS. 7 to 12, the functions of the parameters in the sub image header 6 will be described.

First, the sub image display position/display size will be described.

The sub image display position/display size is control information that represents the display position and display region of the sub image display data on the frame.

The display position and display region on the frame are represented by the sub image display position/display size data as a bit structure such as [b79 X coordinate b64], [b63 Y coordinate b48], [b47 Reserved b32], [b31 Display width b16], and [b15 Display height b0].

Figure 7:
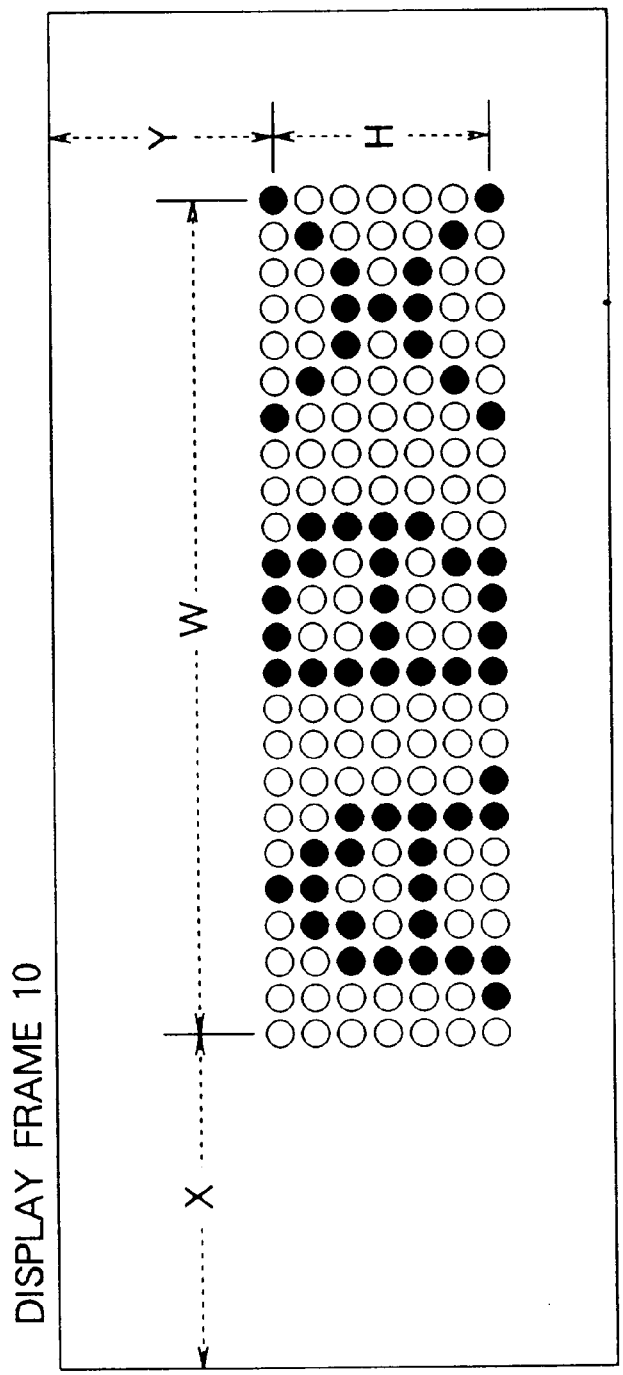
FIG. 7 is a schematic diagram showing a display example of characters on a display frame according to the embodiment.

In this case, as shown in FIG. 7, dot characters as in "ABX" are displayed on the display frame 10. In FIG. 7, ● represents "1" of the sub image data. 0 represents "0" of the sub image data. X represents an X coordinate that is the display start position in the horizontal direction (dot by dot). Y represents a Y coordinate that is the display start position in the vertical direction (line by line). W represents a display width that is the width of the display region in the horizontal direction (dot by dot). H represents a display height that is the width of the display region in the vertical direction (line by line).

Figure 8:
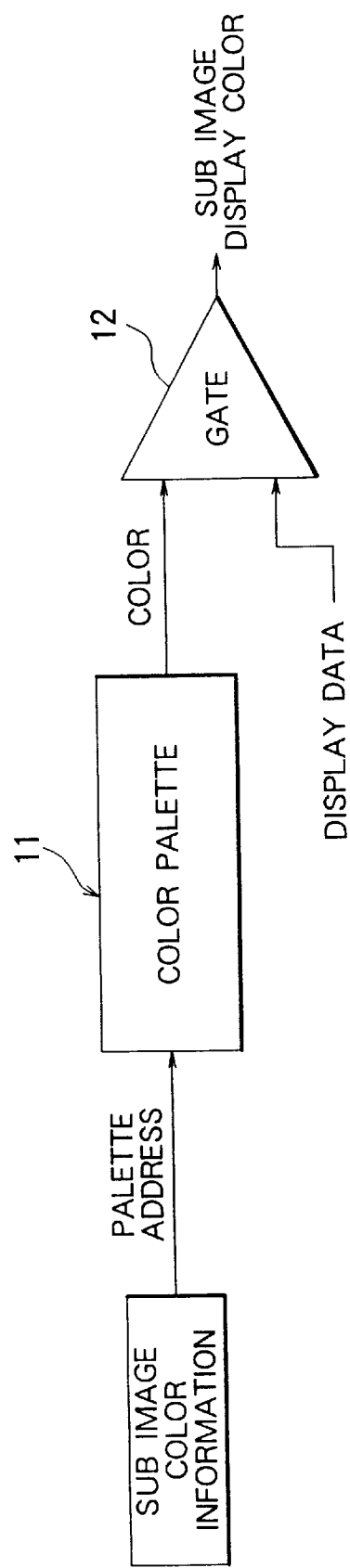
FIG. 8 is a schematic diagram showing a construction of a color palette portion according to the embodiment.

The parameter SPCINFO of the sub image color information designates a color of a portion of which the sub image data is "1". The parameter SPCINFO of the sub image color information is not direct color data, but instead a selection address that assigns one of colors on the color palette 11 (palette address) as shown in FIG. 8. The selected color corresponding to the selection address (palette address) and the display data are ANDed by a gate 12 and output as the sub image display color. The sub image color information data is represented as a bit structure such as [b7 Not used b4] and [b3 Sub image color b0].

Figure 9A:
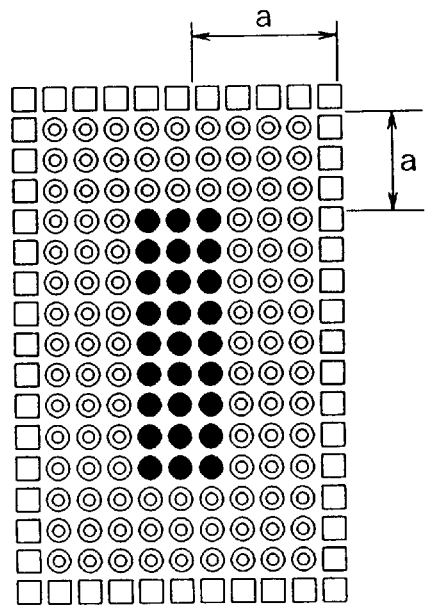
FIG. 9A is a schematic diagram showing sub image contour compensating information according to the embodiment.

As shown in FIG. 9A, in the sub image contour compensating information (parameter SPADJINFO), ● represents "1" of the sub image data. □ represents "0" of the sub image data. ◐ represents the contour of ● When the contour compensation is performed, a portion of which the sub image display data is "1" is contoured in vertical, horizontal, and oblique directions for the number of dots assigned. In addition, the sub image contour compensating information (parameter SPADJINFO) also assigns a color of a portion of which the sub image display data is "1".

Figure 9B:
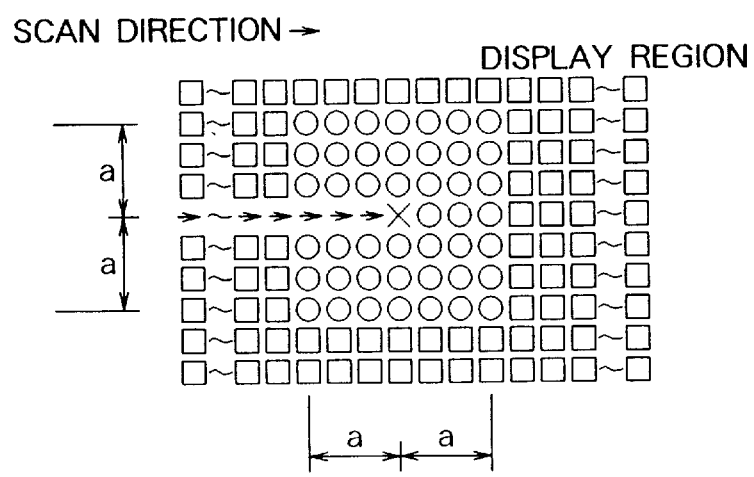
FIG. 9B is a schematic diagram for explaining a contour forming method according to the embodiment.

As shown in FIG. 9B, in the contour forming method corresponding to the sub image contour compensating information (parameter SPADJINFO), when the system display portion scans up to a dot unit X of a display region, if there is a region of which the sub image data is "1" in a region of a dot width A in horizontal and vertical direction (this region is denoted by ○ in FIG. 9B), as long as the sub image data at the dot position X is not "1", the dot position X is contoured. When this operation is performed along dot positions of the entire display region, any portion of the display region can be contoured.

The region of the contour compensation can be represented by the sub image contour compensating information data as a bit structure such as [b7 Execution flag b6], [b5 Contour compensating width b4], and [b3 Contour compensating color b0]. The execution flag selects whether or not to contour a portion of which the sub image data is "1". The contour compensating width represents the width of the contour to be compensated, dot by dot. The contour compensating color represents a display color of the contour compensating portion. The parameter (SPADJINFO) is not direct color data, but a selection address that assigns one of predetermined colors. The basic conception of the sub image contour compensating information is the same as that of the sub image color information.

When a portion of which the sub image data is "1" is displayed, the parameter (SPCONT) of the sub image contrast represents the mixing ratio of a main image and a sub image. The main image and the sub image are mixed by logically adding the main image component and sub image component corresponding to the sub image contrast. This addition can be represented by the following equation.

Output of display image =main image component +sub image component=(255 −value of sub image contrast)÷255× image data+ (value of sub image contrast÷255)×sub image color information However, this equation is satisfied only when the sub image data is "1". When the sub image data is "0", the output of the display image is equal to the main image component.

FIG. 10 shows a logical system (mixing process system) that performs the mixing operation. The logical system comprises selectors 20 and 21, dividing devices 22 and 23, a subtracting device 24, multiplying devices 25 and 26, and an adding device 27.

In the mixing process system, the mixing ratio when the sub image data is "1" is substantially different from the mixing ratio when the sub image data is "0". When the sub image data is "1", the sub image contrast is used as a substantial mixing ratio. When the sub image data is "0", "00H" is used as a substantial mixing ratio.

Thus, the sub image can be faded in and out.

The parameters (SPCDST and SPCDEN) for the sub image display start timing/display end (clear) timing control the display intervals of sub images.

The parameter (SPCDST) for the sub image display start timing control starts the display of the sub image display data at a frame number represented by a frame counter.

Figure 11:
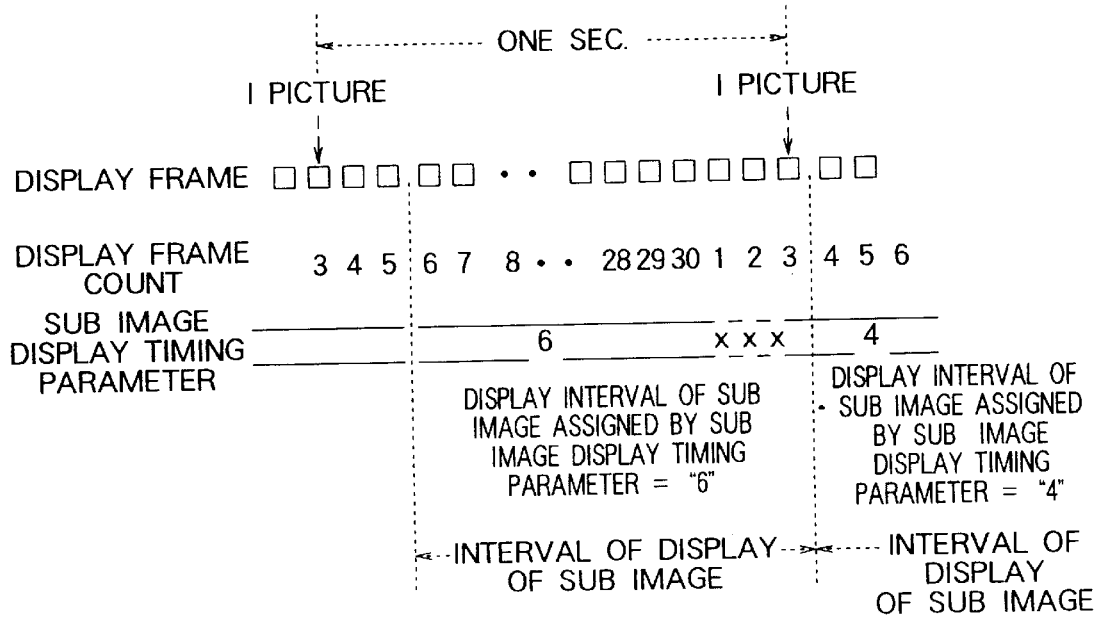
FIG. 11 is a conceptual schematic diagram showing sub image display timing in NTSC system according to the embodiment.

For example, as shown in FIG. 11, in the case of the NTSC system, the display count of the sub image counts from frame "3" at an I picture output frame and continues counting (incrementing) up to frame "30", that is, two frames before the next I picture.

The sub image that is displayed at the frame number of the frame count is continuously displayed until the next sub image display start point takes place or the sub image is cleared by the sub image clear timing data. In FIG. 11, since the sub image display timing data starts with frame "6", and ends with frame "4", the first sub image is displayed while the display frame count counts from frame "6" to frame "4".

The sub image display data is cleared at the assigned frame number of the frame count corresponding to the sub image clear timing data.

Figure 12:
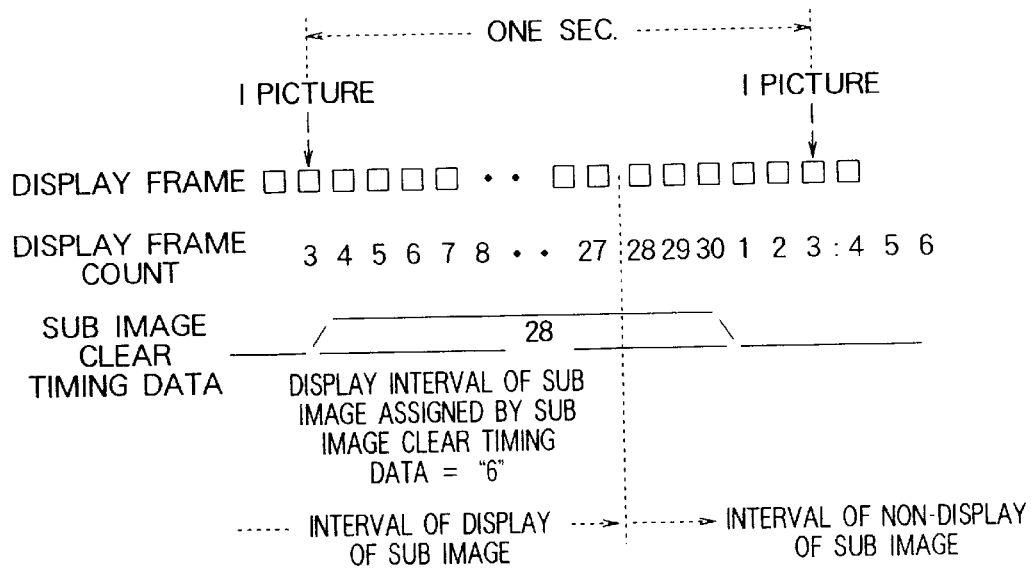
FIG. 12 is a conceptual schematic diagram showing sub image display clearing timing in NTSC system according to the embodiment.

As shown in FIG. 12, the sub image display data is cleared at frame "28".

Figure 13:
FIG. 13 is a table showing the relation between display data order and display positions according to the embodiment.
Figure 14:
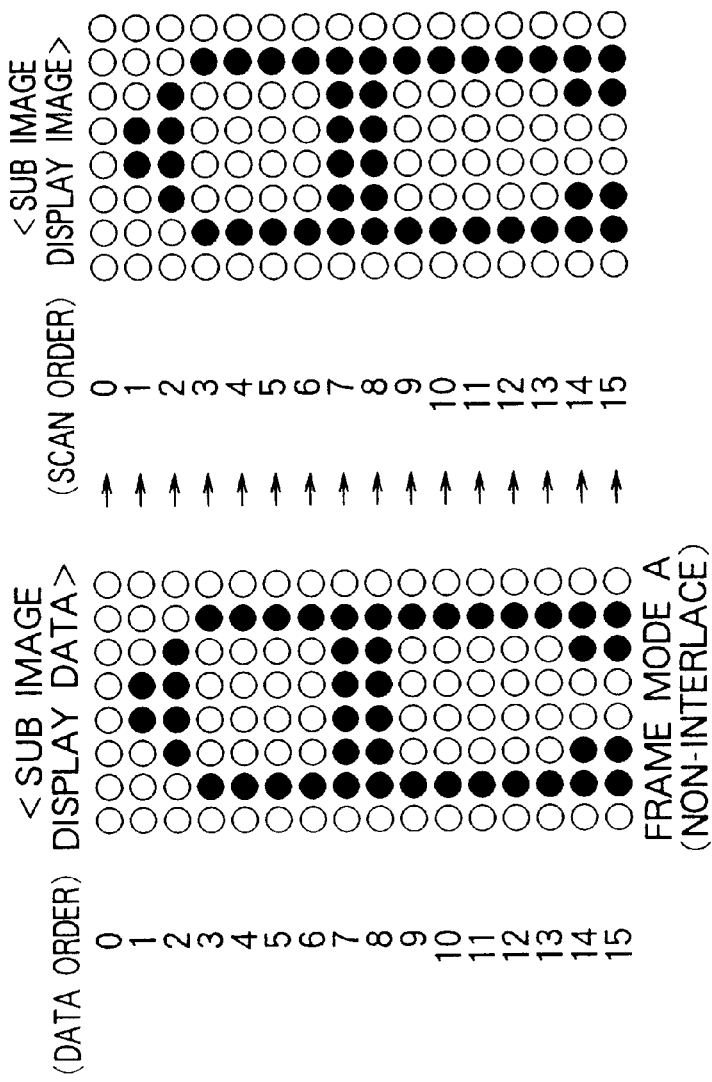
FIG. 14 is a schematic diagram showing the relation between sub image display data and a display image in frame mode A (non-interlace mode) according to the embodiment.
Figure 15:
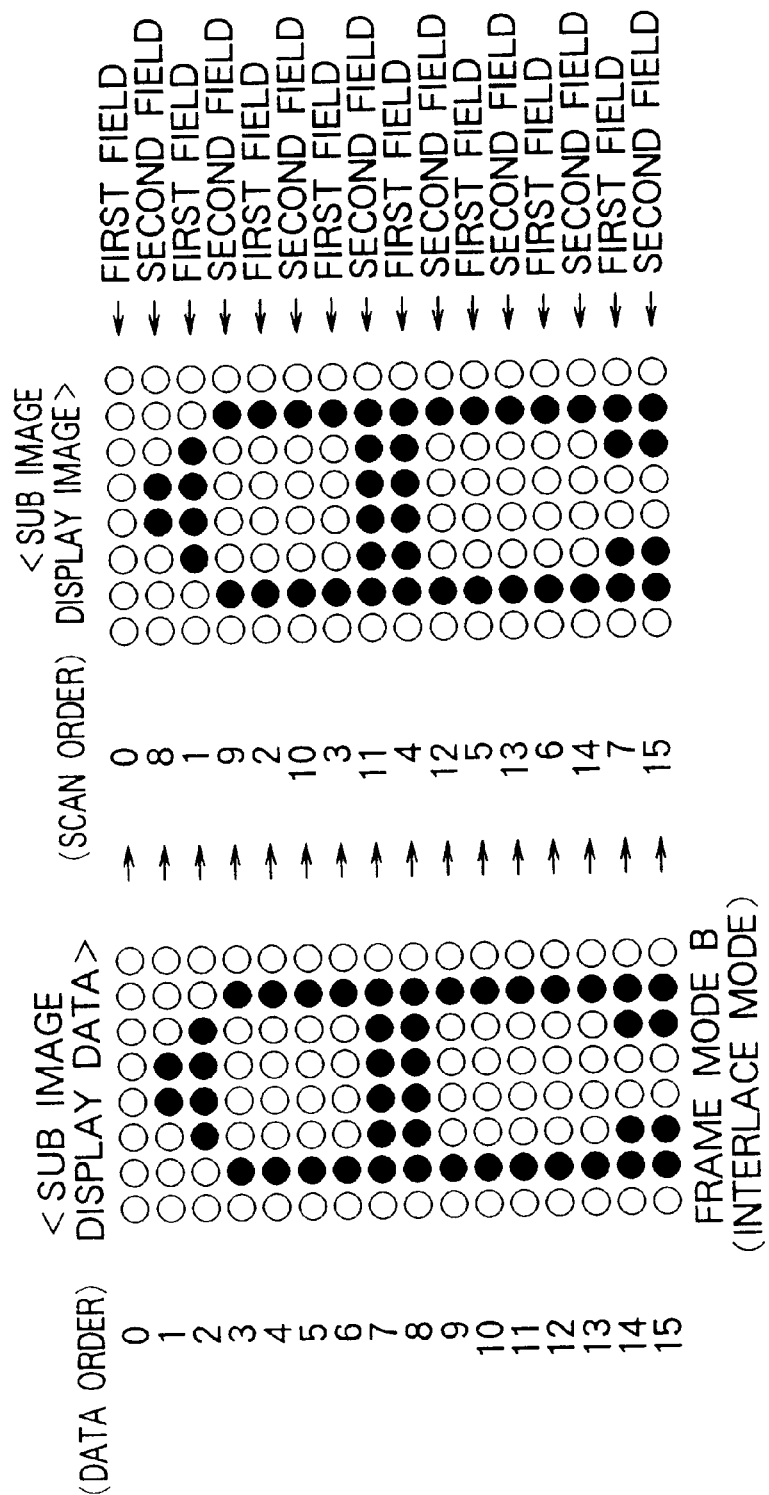
FIG. 15 is a schematic diagram showing the relation between sub image display data and a display image in frame mode B (interlace mode) according to the embodiment.
Figure 16:
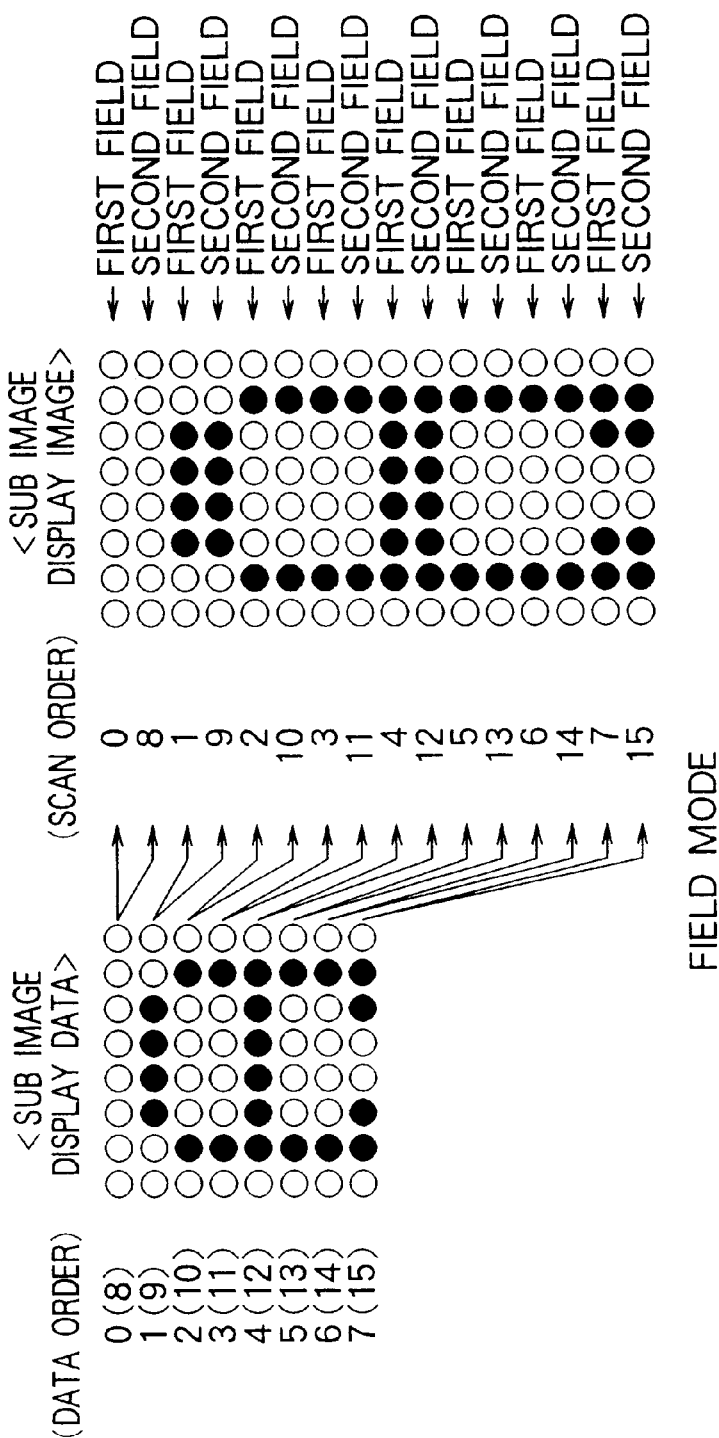
FIG. 16 is a schematic diagram showing the relation between sub image display data and a display image in field mode according to the embodiment.

Next, with reference to FIGS. 13 to 16, the structure of sub image display data and a display image will be described. FIG. 13 shows the relation between a display data order and display positions thereof. FIG. 14 is a schematic diagram showing an example of the relation between sub image display data and a display image in frame mode A (non-interlace mode). FIG. 15 is a schematic diagram showing an example of the relation between sub image display data and a display image in frame mode B (interlace mode). FIG. 16 is a schematic diagram showing an example of the relation between sub image display data and a display image in field mode.

In FIG. 13, sub image display data is displayed from left to right of the display pixels and from top to bottom of the display lines of the display region.

The display method and record method of the sub image display data can be categorized as frame mode (shown in FIGS. 14 and 16) and field mode (shown in FIG. 16). When the sub image display data is recorded in the sub image data packet, the record mode of the sub image display data is also recorded. When the reproducing system displays data, it detects the record mode and controls the display mode.

In the frame mode A (non-interlace mode) shown in FIG. 14, the data order of the sub image display data corresponds with the scan order of the display image. On the other hand, in the frame mode B (interlace mode) shown in FIG. 15, although the data order of the sub image display data does not corresponds with the scan order of the display image, the data amount of the sub image display data accords with the data amount of the display image.

As shown in FIG. 16, it is clear that even if the same region is displayed, the data amount in the field mode is half the data amount in the frame mode.

Next, with reference to FIG. 17, the structure of the sub image control data will be described.

Figure 17:
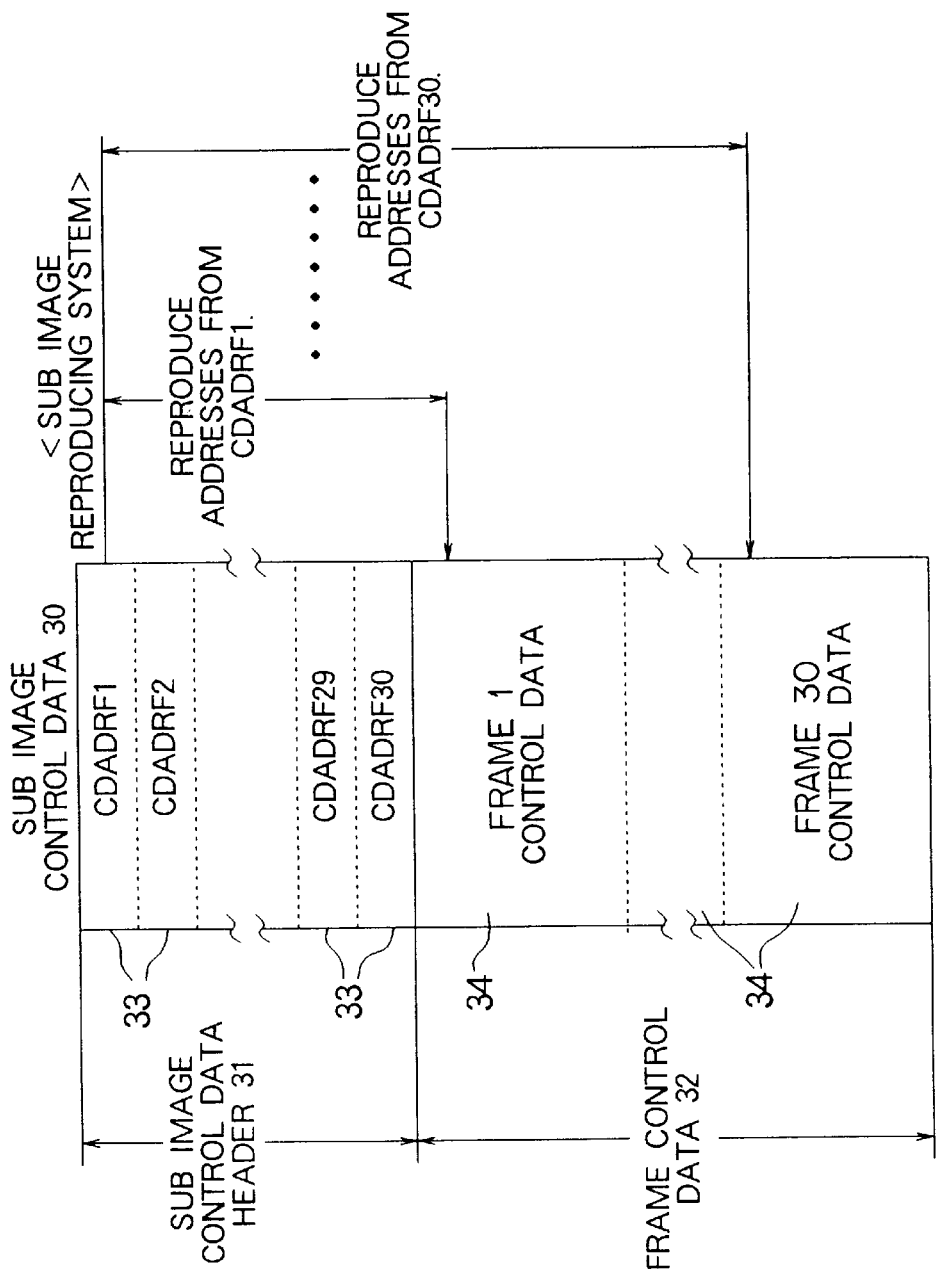
FIG. 17 is a schematic diagram showing a structure of sub image control data according to the embodiment.

Referring to FIG. 17, sub image control data 30 is composed of a sub image control data header 31 and frame control data 32.

In the sub image control data header 31, display frame control data start addresses (CDADRF 1 to 30) 33 are present corresponding to frames of the main image 1. On the other hand, in the frame control data 32, the frame display control data 34 are present corresponding to display frames. The display frame control data start addresses (CDADRF 1 to 30) 33 represent relative positions from the beginning of the sub image control data header 31 of frame control data.

Next, the structure and function of the display frame control data start addresses will be described. In the sub image reproducing system, the display frame control data start addresses (CDADRF 1 to 30) 33 control the sub image display, frame by frame.

Thus, the sub image reproducing system generates the start address of the frame control data corresponding to the display frame control data start address 33 of a frame number to be controlled. With the start address, the sub image reproducing system accesses the frame control data. The display frame control data start address 33 represents the start position of each frame control data that is the number of relative bytes from the sub image control data header. For example, CDADRF 1 represents the start position of the control data of frame 1. Likewise, CDADRF 2 represents the start position of the control data of frame 2. And so on.

Figure 18:
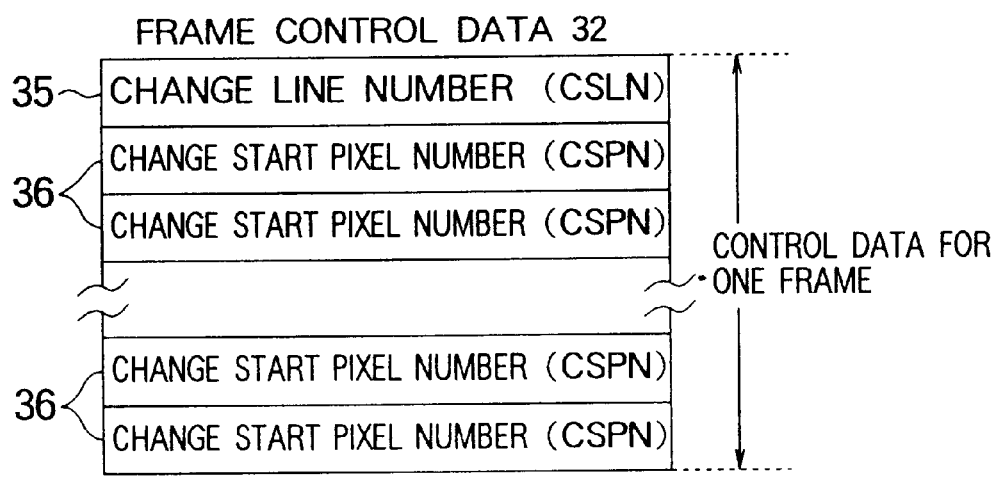
FIG. 18 is a schematic diagram showing a structure of frame control data according to the embodiment.
Figure 19:
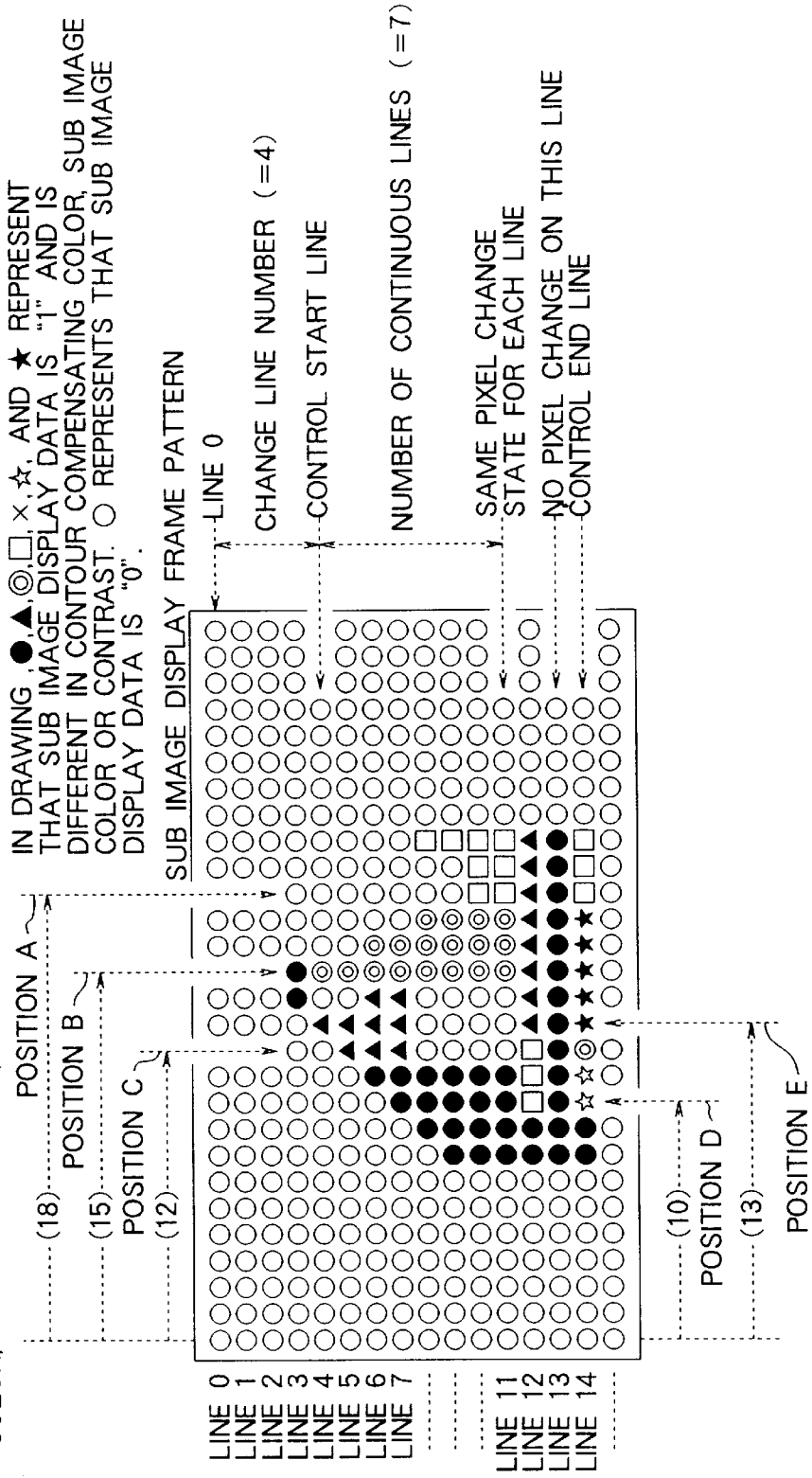
FIG. 19 is a schematic diagram showing an example of a sub image display pattern according to the embodiment.

Next, with reference to FIGS. 18 to 20, the structure and function of the frame control data 32 will be described. FIG. 18 shows a structure of frame control data. FIG. 19 shows an example of a sub image display pattern. FIG. 20 shows an example of frame control data.

As shown in FIG. 18, the frame control data 32 for one frame is composed of a change line number 35 and change start pixel numbers 36.

The change line number 35 represents from what line of a display frame the contour corresponding color, the sub image color, and the contrast are controlled, how many times they are changed on the line, and how many lines they are changed.

The change line number 35 is represented as a bit structure such as [b31 Reserved b28], [b27 Change line number b16], [b15 Number of pixel change points b12], and [b11 Number of continuous lines b0].

The change start pixel number 36 represents a pixel position at which the contour compensating color, the sub image color, and the contrast are changed and a contour compensating color, a sub pixel color, and a contrast that have been changed. The change start pixel numbers continue for the number of change points corresponding to the change line number. The change start pixel number is represented as a bit structure such as [b31 Reserved b28], [b27 Change pixel number b16], [b15 Sub image color after change b12], [b11 Contour compensating color after change b8], and [b7 Contrast ratio after change b0].

In the case of the above-described bit structure, the sub image display pattern is represented by a combination of the change line number 35 and the change start pixel numbers 36.

For example, as shown in FIG. 19, in the case of the bit structure of the change line number, pixel changes start from line "4" to line "11". Since line changes start from line "4", the change line number 35 is "4" and there are three pixel changes at positions A, B, and C, the number of pixel change points is "3" and pixel change state continues to line "11". Thus, the number of continuous lines is ("11"−"4"="7").

At the beginning of the frame control data 32 of the frame, a change line number that represents that a change start line is "4" is present.

Since pixel changes on each line from line "4" to line "11" are the same in the order of positions C, B, and A, change start pixel numbers at positions C, B, and A are arranged from the line following the first change line. This relation is shown in FIG. 20(a).

The number of pixel change points, position, sub image color, contour compensating color, and contrast ratio on line "12" are different from those on line "14". Thus, for each line, a change line number and a change start pixel number should be formed. The number of change continuous lines of each of change line numbers "12" and "14" is "0" because there are no continuous lines.

On line "12", there are two pixel change positions at positions D and E. The change line number that represents the number of continuous line numbers is "0" is followed by change start pixel numbers at positions D and E as shown in FIG. 20(b).

On line "14", there are four pixel changes at positions D, C, E, and A. Thus, a change line number that represents that the number of continuous lines is "0" and also represents that the number of pixel change points is "4" is followed by change start pixel numbers at positions D, C, E, and A as shown in FIG. 20(c). Since there are no pixel changes on line "13", the frame control data 32 is not formed.

On line "3", regions of up to position C on lines "4" to "11", line "13", and regions of up to position D on lines "12" to "14", a sub image with a sub image color, a contour compensating color, and a contrast corresponding to the sub image control data header 31 are displayed instead of frame control data 32. The order of the change line number 35 and the change start pixel numbers 36 of the frame control data 32 shown in FIGS. 18 to 20 should accord with the scan direction of a frame to be displayed.

As shown in FIG. 20(d), in the frame control data 32, a change line number 35 that is defined by a predetermined pattern and that follows the last change start pixel number 36 is formed so that a change start pixel number 36 on a continuous line represents the end of the data structure. The predetermined pattern of the end code, is for example, a bit structure "FFFF0000H" (hexadecimal notation).

Figure 21:
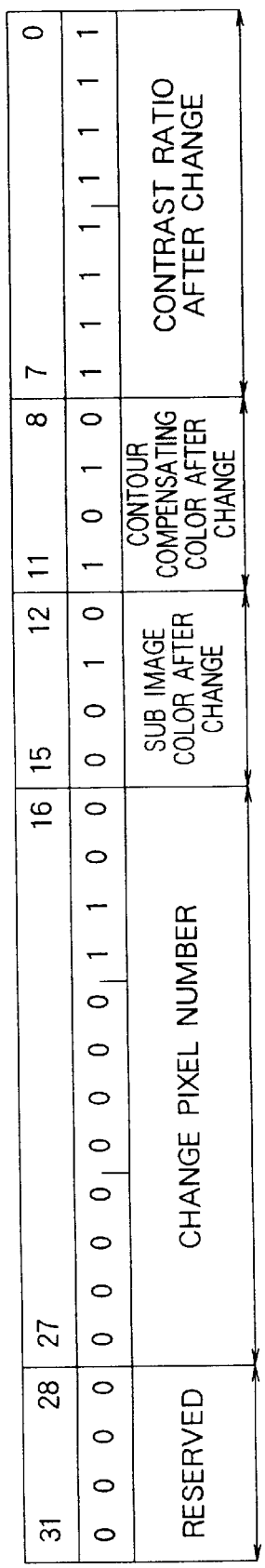
FIG. 21 is a schematic diagram showing reserved bits of a bit structure in binary notation according to the embodiment.

When the reserved bit [b31 Reserved b28] in the bit structure is "0H", the change line number 35 is represented in binary notation as follows (see FIG. 21). "00000000000011000010101011111111". The change line number 35 is represented in hexadecimal notation as follows.

"CSLN=00043007H"

Next, the structure of the change start pixel number 36 on for example line "4" will be described.

FIG. 22 shows changes of sub image colors, contour compensating colors, and contrast ratios. In this case, the pixel change points are present at positions C, B, and A in line direction. First, the pixel change start point at position C is represented corresponding to the example of bit structure. Since position C is present at dot 12 from the left edge of the line, the change pixel number is "12". Referring to FIG. 12, the sub image color, the contour compensating color, and the contrast ratio that are present on the right of position C are "2H", "AH", and "FFH", respectively.

The change start pixel number at position C is represented in binary notation as follows (see FIG. 23).

"000000000000010000110000000000111". The change start pixel number is represented in hexadecimal notation as follows.

"CSPN=000C2AFFH".

At position C, although the contour compensating color does not change, the right side portion (on the line in scan direction) of position C should be written for the changed contour compensating color. This applies to the other sub image colors and contrast ratios.

Position B is present at dot 15 and only the sub image color changes from "2H" to "1H". The change start pixel number at position B can be represented in hexadecimal notation as follows.

"CSPN (at position B)=000F1AFFH" that is changed from

"CSPN (at position A)=000C2AFFH".

Thus, it is clear that "C2" is changed to "F1". Likewise, Position A is present at dot 18 and the sub image color and contour compensating color change to "5H" and "4H", respectively. Thus, the change start pixel number at position A can be represented in hexadecimal notation as follows.

"CSPN (at position A)=001254FFH" that is changed from

"CSPN (at position B)=000F1AFFH" Thus, it is clear that "0FA1" is changed to "1254". Consequently, the data shown in FIG. 20(a) can be represented in hexadecimal notation as shown in FIG. 24.

Figure 25:
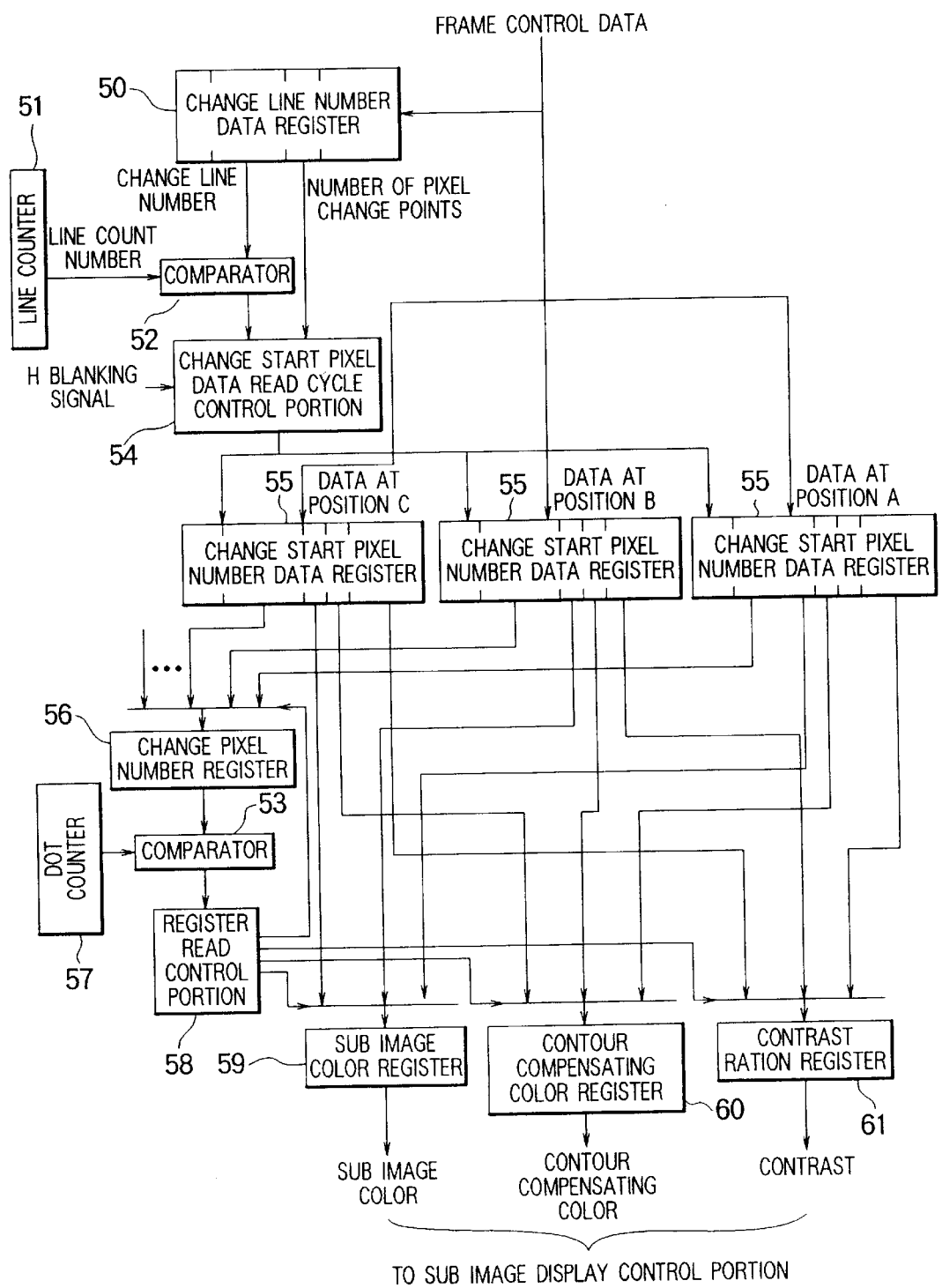
FIG. 25 is a schematic diagram showing a construction of a sub image process system according to the embodiment.
Figure 26:
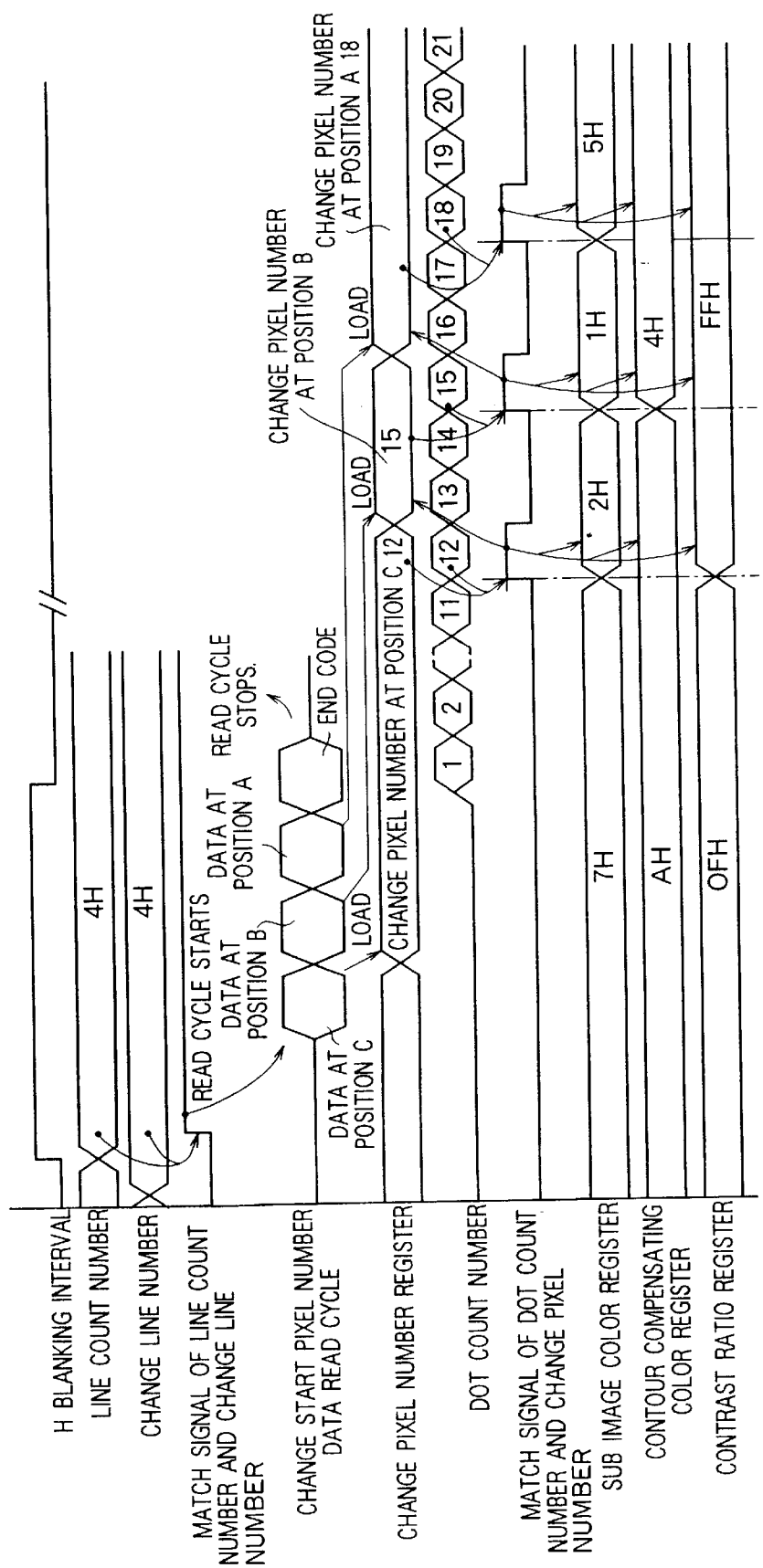
FIG. 26 is a schematic diagram showing a timing chart on which frame control data is processed according to the embodiment.
Figure 27:
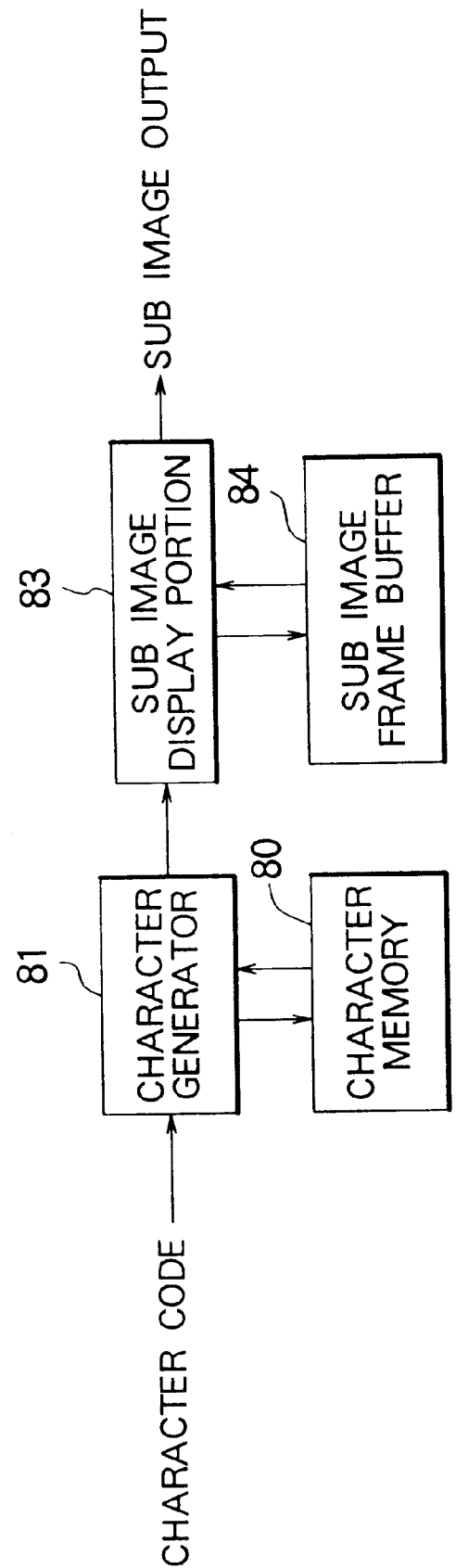
FIG. 27 is a schematic diagram for explaining a conventional character code system.

Next, with reference to FIGS. 25 and 26, the construction of the sub image process system and operating timing will be described. FIG. 25 is a block diagram showing the sub image process system. FIG. 26 is a timing chart of a process for the frame control data.

As shown in FIG. 25, the sub image process system comprises a change line number data register 50, a line counter 51, comparators 52 and 53, a change start pixel data read cycle control portion 54, a change start pixel number data register 55, a change pixel number register 56, a dot counter 57, a register read control portion 58, a sub image color register 59, a contour compensating color register 60, and a contrast ratio register 61.

The change line number data register 50 holds a change line number corresponding to frame control data. The line counter 51 counts a line number. The comparator 52 compares a change line number with a line count value. When they match, the comparator 52 outputs a match signal. The change start pixel data read cycle control portion 54 receives the number of pixel change points, the match signal (received from the comparator 52), a horizontal (H) blanking signal, and so forth and controls the holding timing of the change start pixel number data. The change start pixel number data register 55 holds position data at the control timing of the change start pixel data read cycle control portion 54. The change pixel number register 56 holds a change pixel number. The comparator 53 compares the count value of the dot counter 57 with the value of the change pixel number register. When they match, the comparator 53 outputs a match signal to the register read control portion 58. The register read control portion 58 controls the data hold timing of each of the sub image color register 59, the contour compensating color register 60, and the contrast ratio register 61 corresponding to the match signal received from the comparator 53.

In the sub image process system, the frame control data is processed as follows.

In other words, as shown in FIG. 26, when the line count number counted by the line counter 51 of the display portion matches the change line number in the change line number data of the frame control data, the comparator 52 outputs the match signal to the change start pixel data read cycle control portion 54. Thus, the change start pixel data read cycle control portion 54 starts the read cycle.

The change start pixel data read cycle control portion 54 stores change start pixel numbers necessary for changing pixels on a line to a process portion (namely, each change start pixel number data register 55) in the first horizontal (H) blanking interval. Alternatively, the change start pixel data read cycle control portion 54 stores the change start pixel numbers to each change start pixel number data register 55 until change line number data that represents an end code takes place.

At this point, the horizontal dot counter 57 is incremented by "1" for the line. When the comparator 53 has determined that the dot count value matches the change pixel number of the change start pixel number data, the comparator 53 outputs the match signal to the register read control portion 58.

The register read control portion 58 holds a sub image color, a contour compensating color, and a contrast ratio that have been all changed in the process portion (namely, the sub image color register 59, the contour compensating color register 60, and the contrast ratio register 61). The data held in the sub image color register 59, the contour compensating color register 60, and the contrast ratio register 61 are used as sub image display control data until the next pixel change point takes place.

Although the sub image process system performs the above-described operation whenever it scans each line, when the number of continuous lines in the change line number is other than "0", after the count line number matches the change line number of the change line number data, while the lines corresponding to the number of continuous lines are being scanned, the same change start pixel number data is read and the same sub image display control is repeated.

According to the embodiment of the present invention, since the data amount is remarkably reduced by the simple sub image data packet system and the degree of flexibility of the representation of a sub image is provided by the bit map data system, the display spatial loss and display temporal loss of the sub image data can be reduced and the applications of the sub image can be widened.

According to the sub image data packet system, since data assigning a display region of a sub image is provided and images outside than the display region is not displayed, display spatial loss when all data for one frame is transmitted to the display portion can be remarkably reduced. In an assigned display region, only information of shapes of sub images to be displayed are sub image display data. Thus, the color information data, contour color data, and contrast data (these data are referred to as color information) required for each pixel can be reduced. In addition, since the sub image display data is bit map data, the shapes of sub images can be freely displayed.

Default values are assigned for the color information of sub images. When and where the state of a sub image changes, new color information is assigned. The color information that is reassigned is formed as a packet of frame control data independent from sub image display data. The position of the frame control data can be assigned, pixel by pixel. Thus, the sub image color can be controlled with the same accuracy as the conventional bit map data system. Since most color information of a normal sub image does not change pixel by pixel, the color information is not assigned pixel by pixel. Thus, the color information data (frame control data) can be remarkably reduced.

The sub image display data is continuously output from the display portion in a plurality of frame intervals unless the shape of the sub image changes. In these intervals, the color of the sub image is controlled by frame control data in the same sub image packet. Thus, it is not necessary to continuously supply the complete bit map data even if color information partly changes. Thus, display temporal loss of the sub image data can be remarkably reduced.

As described above, according to the present invention, the display position, the display size, and the display color of the sub image data can change for each display unit of the main image. Thus, losses in data transmission and display control can be reduced.

The sub image can be freely displayed by the bit map data system. In addition, information that assigns a display region of the sub image is provided so that data outside the display region is not transmitted and displayed. Thus, since it is not necessary to transmit all pixel data for one frame to the display portion, display spatial loss can be reduced.

Consequently, display spatial loss and display temporal loss can be remarkably reduced and sub images that have large flexibility can be accomplished.

In the assigned display region, only information of shapes of sub images to be displayed is treated as display data. The display color, the contour compensating color, and the sub image contrast that are required for each pixel are formed in a header portion. Thus, the amount of data to be transmitted can be reduced. Since the display data portion is bit map data, the shapes of sub images can be freely displayed.

Default values are assigned for the color information of sub images. When and where the state of a sub image changes, new color information is assigned. The color information that is reassigned is formed as a packet of frame control data independent from sub image display data. The position of the frame control data can be assigned, pixel by pixel. Thus, the sub image color can be controlled with the same accuracy as the conventional bit map data system. Since most color information of a normal sub image does not change, pixel by pixel, the color information is not assigned, pixel by pixel. Thus, the color information data (frame control data) can be remarkably reduced.

The sub image display data is continuously output from the display portion in a plurality of frame intervals unless the shape of the sub image changes. In these intervals, the color of the sub image is controlled by frame control data in the same sub image packet. Thus, it is not necessary to continuously supply the complete bit map data even if color information partly changes. Thus, display temporal loss of the sub image data can be remarkably reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A recording medium for recording a sub image data packet for superimposing a sub image data on a main image data, the sub image data packet comprising:

a header portion disposed at the beginning of the sub image data packet;

a sub image data portion disposed behind the header portion, said sub image data portion storing the sub image data to be superimposed on the main image data; and a control data portion disposed behind the sub image data portion, said control data portion storing control data for changing sub image information timewise, said sub image information designating display position, display size and display color of said sub image data, wherein the header portion includes a start address of the control data portion; and wherein the sub image information comprises information on compensating the sub image data.

2. A recording medium for recording a sub image data packet for superimposing a sub image data on a main image data, the sub image data packet comprising:

a header portion disposed at the beginning of the sub image data packet;

a sub image data portion disposed behind the header portion, said sub image data portion storing the sub image data to be superimposed on the main image data; and a control data portion disposed behind the sub image data portion, said control data portion storing control data for changing sub image information timewise, said sub image information designating display position, display size and display color of said sub image data, wherein the header portion includes a start address of the control data portion; and wherein the sub image information comprises information on contrast between the sub image data and the main image data.

3. A reproducing apparatus for reproducing a sub image data to be superimposed on a main image data, said apparatus comprising:

inputting means for inputting a sub image data packet from a disk on which the sub image data packet is recorded, said sub image data packet comprising a header portion disposed at the beginning of the sub image data packet; a sub image data portion disposed behind the header portion, said sub image data portion storing the sub image data to be superimposed on the main image data; and a control data portion disposed behind the sub image data portion, said control data portion control data for changing sub image information timewise, said sub image information designating display position, display size, and display color of said sub image data, wherein the header portion includes a start address of the control data portion;

generating means for generating the sub image data from the sub image data packet input by said inputting means; and displaying means for displaying the sub image data generated by said generating means on the basis of the sub image information, wherein the sub image information comprises information on compensating the sub image data.

4. A reproducing apparatus for reproducing a sub image data to be superimposed on a main image data, said apparatus comprising:

inputting means for inputting a sub image data packet from a disk on which the sub image data packet is recorded, said sub image data packet comprising a header portion disposed at the beginning of the sub image data packet; a sub image data portion disposed behind the header portion, said sub image data portion storing the sub image data to be superimposed on the main image data; and a control data portion disposed behind the sub image data portion, said control data portion control data for changing sub image information timewise, said sub image information designating display position, display size,and display color of said sub image data, wherein the header portion includes astart address of the control data portion;

generating means for generating the sub image data from the sub image data packet input by said inputting means; and displaying means for displaying the sub image data generated by said generating means on the basis of the sub image information, wherein the sub image information comprises information on contrast between the sub image data and the main image data.

* * * * *